US012747608B2

(12) United States Patent
Baitx et al.

(10) Patent No.: US 12,747,608 B2
(45) Date of Patent: Sep. 29, 2026

(54) FLUSH LOCK FOR CASEMENT WINDOW HAVING A LOW-PROFILE LOCK HANDLE AND METHOD OF OPERATING THE SAME

(71) Applicant: ASSA ABLOY Fenestration, LLC, Rochester, NY (US)

(72) Inventors: Jacob Baitx, Reno, NV (US); Peter J. Minter, Reno, NV (US); Marc Wesley Fullenwider, Reno, NV (US)

(73) Assignee: ASSA ABLOY FENESTRATION, LLC, Rochester, NY (US)

( * ) Notice: Subject to any disclaimer, the term of this patent is extended or adjusted under 35 U.S.C. 154(b) by 0 days.

(21) Appl. No.: 19/036,547

(22) Filed: Jan. 24, 2025

(65) Prior Publication Data

US 2026/0218540 A1 Jul. 30, 2026

(51) Int. Cl.
*E05B 5/02* (2006.01)
*E05C 1/06* (2006.01)

(52) U.S. Cl.
CPC ................ *E05B 5/003* (2013.01); *E05C 1/06* (2013.01)

(58) Field of Classification Search
CPC . E05B 5/00; E05B 5/003; E05B 5/006; E05B 65/06; E05B 83/34; E05C 1/06; E05C 1/065; Y10S 292/04; Y10S 292/20; Y10S 292/33
See application file for complete search history.

(56) References Cited

U.S. PATENT DOCUMENTS 9,109,384 B2 * 8/2015 Minter ...................... E05B 5/00
9,260,893 B1 2/2016 Ruspil
9,777,509 B2 10/2017 Minter et al.
10,648,195 B2 * 5/2020 Minter .................... E05B 5/006
10,837,197 B2 * 11/2020 Kightlinger ............. E05B 5/003
(Continued)

FOREIGN PATENT DOCUMENTS

CN 116427785 A * 7/2023 ............... E05B 3/00
CN 118911526 A * 11/2024 ........... E05B 17/002
(Continued)

OTHER PUBLICATIONS

Computer Generated Translation for JP 2002327558 A, Generated on Jan. 22, 2026, https://worldwide.espacenet.com/patent/ (Year: 2026).*

*Primary Examiner* — Alyson M Merlino
(74) *Attorney, Agent, or Firm* — DeLio Peterson & Curcio LLC; David R. Pegnataro

(57) ABSTRACT

A flush mount or low-profile actuating window lock for casement windows having a casing with an upper housing and a lower housing, and a detent mechanism housing extending from the bottom surface of the upper housing, incorporating a sleeve, a plunger, a ratchet, and a spring of a detent mechanism. The detent mechanism provides a push-push activation for latching and unlatching a lever, where the lever is flush mounted when the window lock is in a locked position. Upon activation for unlocking, the lever is pressed below the top surface of the casing housing, and the detent mechanism pushes the lever to a "popped" or "open" position for grasping and rotating by a user. Upon activation for locking, the lever is returned to the initial position and pressed below the top surface of the casing housing where the detent mechanism receives the lever and returns it to a flush mounted position.

20 Claims, 10 Drawing Sheets

(56) References Cited

U.S. PATENT DOCUMENTS

| | | | | | |
|---|---|---|---|---|---|
| 11,118,374 | B2 * | 9/2021 | Minter | .................... | E05B 5/006 |
| 11,124,995 | B2 * | 9/2021 | Hirano | .................... | E05B 83/34 |
| 11,578,512 | B2 * | 2/2023 | Ge | .......................... | E05B 85/16 |
| 2019/0242165 | A1 * | 8/2019 | Gebel | ..................... | E05C 19/04 |

FOREIGN PATENT DOCUMENTS

| | | | | | | |
|---|---|---|---|---|---|---|
| JP | 2002327558 | A | * | 11/2002 | | |
| KR | 19990030816 | U | * | 7/1999 | ........... | E05B 1/0092 |
| KR | 839899 | B1 | * | 6/2008 | | |
| KR | 102125251 | B1 | * | 6/2020 | ............. | E05B 1/003 |

* cited by examiner

FLUSH LOCK FOR CASEMENT WINDOW HAVING A LOW-PROFILE LOCK HANDLE AND METHOD OF OPERATING THE SAME

BACKGROUND OF THE INVENTION

1. Field of the Invention

The present invention is directed towards window locks, and particularly towards manually locking handles for actuating window locks. Specifically, the present invention is directed to a flush mount or low-profile actuating window lock for casement windows. More specifically, the present invention is directed to an improvement to a flush mounted lock designed to drive a lock bar that locks and unlocks a casement window, and protrudes from the window frame significantly less than prior art designs while reducing the amount of the mechanism that is protruding from the surface of the window, and adds additional functionality to store and access the lock lever when not in use.

2. Description of Related Art

Generally, a casement window is a window unit in which the single vent cranks outward to the right or left. Casement windows are hinged at the side. Casement windows are used singly or in pairs within a common frame. These types of windows are often held open using a casement stay. Casement windows open like doors. Like doors, either the left or right side is hinged (or, more accurately, pivoted), and the non-hinged side locks securely into place by a lock bar driven by a lock handle. Unlike a door, the casement window opens not by a knob or handle but by means of some variation of a gear driven operator or lever, which is placed around hand height or at the bottom. A gear driven operator, stay, or friction hinge, controls the position of the sash, and is necessary when the window opens outward to hold the window in position during inclement weather, such as high winds.

Lock handles of the prior art are known to protrude from the casement window frame at a distance of approximately 20-25 mm. This protrusion is due to the internal driving mechanism within the handle. Casement window lock handles of the prior art drive a fork or actuator component, which engages and slides a lock bar. In order to drive the fork component from one side to the other, the handle casing must have sufficient depth to allow for the handle to pivot about the casing and to allow the fork internally to shift from side to side.

The most relevant prior art teaches or discloses a locking mechanism capable of low profile (on the order of 8 mm) flush mounting adaptable to work with existing tie bar locking designs. For example, in U.S. Pat. No. 9,777,509 owned by Assa Abloy Fenestration LLC, and issued on Oct. 3, 2017, titled "FLUSH LOCK FOR CASEMENT WINDOW AND METHOD OF OPERATING THE SAME," a low profile actuating window lock for a casement window is taught having a handle actuate a fork component in slidable communication with the window lock casing, the handle pivotable about the fork component and pivotable about a restrictor arm that pivots relative to the casing, allowing the handle to rotate fully from the locked position to the unlocked position with low clearance from the window frame.

In U.S. Pat. No. 11,118,374 owned by Assa Abloy Fenestration LLC, and issued on Sep. 14, 2021, titled "STRAIGHT ACTION FLUSH LOCK FOR CASEMENT WINDOW AND METHOD OF OPERATING THE SAME," teaches a low profile actuating window lock for casement windows having a longitudinal slot in a sidewall of the casing for the lock, wherein an actuator including a fork component translates within the slot in a direction opposite movement of the handle, the handle being pivotable about a restrictor arm that pivots relative to the casing, allowing the handle to rotate from the locked position to the unlocked position with low clearance from the window frame. This design requires a latch release button, separate and distinct from the handle, to release the handle and allow it to be rotated to an unlocked position.

In general, the prior art is silent with respect to salient features of the present invention that achieve flush mounting utilizing a user operated push-push latch/release mechanism without having to employ a latch release button.

SUMMARY OF THE INVENTION

Bearing in mind the problems and deficiencies of the prior art, it is therefore an object of the present invention to provide a casement window lock that is flush mounted with a significantly lower profile than the current state of the art.

It is yet another object of the present invention to provide a casement window lock that includes an internal, releasable latch mechanism, activated by a user-initiated push-push motion of the lever or handle, which maintains the handle in a flush or low-profile position when in a locked state.

It is another object of the present invention to use a detent mechanism to allow access to the handle or lever, and allow the handle or lever to return to a flush position upon locking;

The above and other objects, which will be apparent to those skilled in the art, are achieved in the present invention which is directed to a flush lock for a casement window, comprising: a handle or lever arm; a casing including: an upper housing having a bottom surface, and a lower housing having a first and second sidewall; and a detent mechanism housing extending from the bottom surface of the upper housing; the lower housing including an elongated aperture or slot to accommodate a full range of motion of the handle or lever arm, the first or second sidewall having guide tracks to confine movement of a fork or actuator component; the fork component slidable in a longitudinal direction parallel with the elongated aperture or slot of the lower housing, and configured to engage a lock bar, and having a body configured for slidably engaging the guide tracks; and a detent mechanism forming a push-push activation of the handle or lever, the detent mechanism including a sleeve, a plunger, a ratchet, a spring, and a cap, the detent mechanism housed within the detent mechanism housing.

The fork component may include a formed lifter guide track for slidably receiving a lifter, such that the lifter is slidably engaged to move in a direction perpendicular to the longitudinal direction, upwards towards the lever arm.

The sleeve is configured to slidably interact with the plunger, the sleeve being a shell having an internal cavity, and internal segments extending axially along a center axis of the sleeve and radially inwards. The internal segments of the sleeve are separated by gaps, and the internal segments extend axially less than a full length of the sleeve.

The internal segments include a first set of segments and a second set of segments, wherein the first set of segments are longer in the axial direction than the second set of segments.

The plunger is configured to be received by the internal cavity of the sleeve, the plunger having fixed guides extending radially outwards about a base of the plunger, the fixed guides slidably interact with the gaps of the sleeve during activation. The plunger includes a bottom or base portion having saw-toothed teeth protruding beyond the bottom or base portion, the saw-toothed teeth configured to form a camming action with the ratchet, wherein upon activation of the plunger, the camming action rotates the plunger.

The plunger may include two internal cylindrical cavities, a first cavity having a smaller cavity diameter than a larger second cavity, wherein together, the first and second cavities form an internal shelf structure.

The sleeve may form a polygon shape at least on an outside surface.

The ratchet includes a base portion and a cylindrical stem extending from the base portion, the base portion having an outer diameter larger than an outer diameter of the cylindrical stem, and axially directed keys extending radially outwards from a bottom to a top surface of the base portion, including having a radially inward segment at the base portion top surface, the radially inward segment extending to an outer surface of cylindrical stem.

The axially directed keys of the ratchet include inclined surfaces that are angled in an axial direction on the key sides towards a top surface of the radially inward segment of the ratchet, such that the inclined surfaces form a camming action, when placed in contact with the saw-toothed teeth of the plunger.

A spring provides a resilient force to the ratchet and plunger configuration at one end, and to a cap at an opposite end, the cap sealing the spring within the detent mechanism housing.

The horizontal movement of the fork component may be controlled by one of the guide tracks of the lower housing first or second sidewall, and wherein the first or second sidewall of the lower housing portion includes a guide track for receiving an extension of the lifter and having at least an angled section and a partially horizontal section.

In a second embodiment, the present invention is directed to a flush lock for a casement window, comprising: a lever arm; a casing including: an upper housing; and a lower housing including an elongated aperture or slot to accommodate a full range of motion of the lever arm, sidewalls having guide tracks to confine movement of a fork or actuator component, and having a detent mechanism housing extending from a bottom surface of the lower housing, the detent mechanism housing secured at a bottom end by a cap; a restrictor arm pivotally attached at one end to the lever arm, and pivotally attached at an opposite end to the lower housing; and a detent mechanism forming a push-push activation of the lever, the detent mechanism including: a sleeve being substantially a shell having an internal cavity and internal segments extending axially along a center axis of the sleeve, the internal segments extending radially inwards and being separated by gaps, and extending axially less than a full length of the sleeve, each of the internal segments having a top surface; a plunger, configured to be received by the internal cavity of the sleeve, the plunger includes fixed guides extending circumferentially radially outwards about a base of the plunger, the fixed guides slidably interact with the gaps of the sleeve during activation, the plunger includes a bottom or base portion having teeth protruding beyond the bottom or base portion, the teeth configured to form a camming action with a ratchet, rotating the plunger; the ratchet having a base portion and a cylindrical stem extending from the base portion, the base portion having an outer diameter larger than an outer diameter of the cylindrical stem, and axially directed keys extending radially outwards from a bottom to a top surface of the base portion, including having a radially inward segment at the base portion top surface, the radially inward segment extending to an outer surface of cylindrical stem, wherein the axially directed keys include inclined surfaces that angle axially upwards along a side of the axially directed keys to a top surface of the radially inward segment of the ratchet, such that the inclined surfaces form a camming action when placed in contact with the teeth of the plunger, rotating the plunger; and a spring providing a resilient force to the ratchet and the plunger configuration at one end, and to the cap at an opposite end, the cap sealing the spring within the detent mechanism housing.

An escutcheon is attached to the upper housing of the casing, the escutcheon having a top surface and a slot or aperture for receiving the lever arm.

The casing has a depth for receiving the lever arm below the top surface of the escutcheon, and the detent mechanism allowing for the lever to be pushed below the top surface of the escutcheon.

The detent mechanism provides a structural block for the vertically upward extension of the plunger, such that upon an OPEN activation, the lever arm is raised above the escutcheon top surface to enable grasping by a user.

In a third aspect, the present invention is directed to a method of unlocking a flush lock for a casement window, the method comprising: providing a flush lock having a lever arm for actuating a fork component associated with a locking tie bar of the casement window, and a detent mechanism configured for push-push activation, the detent mechanism including a sleeve, a plunger, a ratchet, a spring, and a cap, the detent mechanism housed within a detent mechanism housing of a casing of the flush lock; pushing the lever arm from an initial position flush with a top surface of an escutcheon that forms part of a top surface of the casing towards the casing and below the top surface of the escutcheon to release the lever arm; releasing the lever, such that the detent mechanism acts on the lever arm to extend the lever above the top surface of the escutcheon, exposing the lever arm in an open position away from the escutcheon top surface for grasping by a user; and rotating the lever to an unlocked position to unlock the casement window.

The step of pushing the lever arm in a direction towards the casing and below the top surface of the escutcheon includes lowering the plunger against the ratchet such that the plunger rotates relative to the sleeve in a camming function.

The sleeve includes an internal cavity and internal segments extending axially along a center axis of the sleeve, the internal segments extending radially inwards and being separated by gaps, extending axially less than a full length of the sleeve, and the internal segments including a first set of internal segments axially longer than a second set of internal segments, each of the internal segments having a top surface; and wherein the plunger includes fixed guides extending circumferentially radially outwards about a base of the plunger; slidably interacting the fixed guides with the gaps of the sleeve during activation, the plunger having a bottom or base portion having teeth protruding beyond the bottom or base portion, the teeth configured to form a camming action with the ratchet, rotating the plunger; situating the plunger fixed guides on a top surface of the first set of internal segments, such that the plunger raises the lever arm above the escutcheon top surface.

In a fourth aspect, the present invention is directed to a method of locking a flush lock for a casement window, the method comprising: providing a flush lock having a lever arm for actuating a fork component associated with a locking tie bar of the casement window, and a detent mechanism configured for push-push activation, the detent mechanism including a sleeve, a plunger, a ratchet, a spring, and a cap, the detent mechanism housed within a detent mechanism housing of a casing of the flush lock; rotating the lever arm towards the flush lock; pushing the lever arm from an initial position above a top surface of an escutcheon that forms part of a top surface of the casing towards the casing and below the top surface of the escutcheon; releasing the lever, such that the detent mechanism acts on the lever arm to align a top surface of the lever arm with the top surface of the escutcheon, such that the top surface of the lever arm is flush with the escutcheon top surface.

The sleeve includes an internal cavity and internal segments extending axially along a center axis of the sleeve, the internal segments extending radially inwards and being separated by gaps, extending axially less than a full length of the sleeve, and the internal segments including a first set of internal segments axially longer than a second set of internal segments, each of the internal segments having a top surface; and wherein the plunger includes fixed guides extending circumferentially radially outwards about a base of the plunger; slidably interacting the fixed guides with the gaps of the sleeve during activation, the plunger having a bottom or base portion having teeth protruding beyond the bottom or base portion, the teeth configured to form a camming action with the ratchet, rotating the plunger; situating the plunger fixed guides on a top surface of the first set of internal segments, such that the plunger raises the lever arm to a level of the escutcheon top surface.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
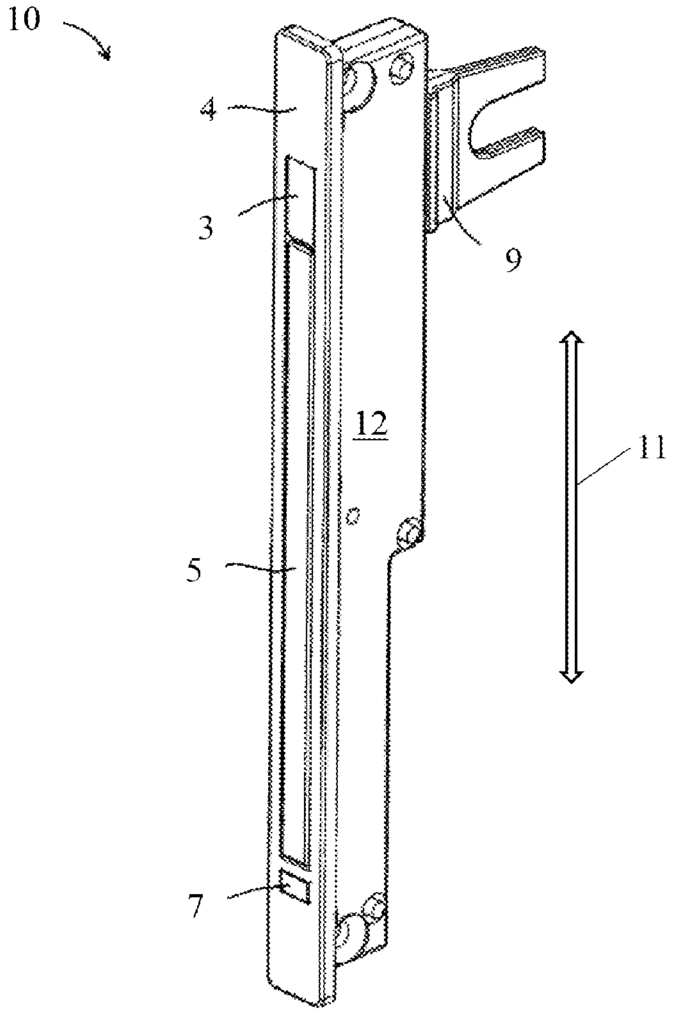
FIG. 1 (PRIOR ART)
FIG. 1 is a front perspective view of an embodiment of the prior art, illustrating a straight action lock for a casement window with the handle in the locked position and a separate release button for accessing the handle.

In describing the preferred embodiment of the present invention, reference will be made herein to FIGS. 1-14 of the drawings in which like numerals refer to like features of the invention.

Certain terminology is used herein for convenience only and is not to be taken as a limitation of the invention. For example, words such as "upper," "lower," "left," "right," "front," "rear," "horizontal," "vertical," "upward," "downward," "clockwise," "counterclockwise," "longitudinal," "lateral," or the like, merely describe the configuration shown in the drawings. Indeed, the referenced components may be oriented in any direction and the terminology, therefore, should be understood as encompassing such variations unless specified otherwise. For purposes of clarity, the same reference numbers may be used in the drawings to identify similar elements.

Additionally, in the subject description, the words "exemplary," "illustrative," or the like, are used to mean serving as an example, instance, or illustration. Any aspect or design described herein as "exemplary" or "illustrative" is not necessarily intended to be construed as preferred or advantageous over other aspects or design. Rather, the use of the words "exemplary" or "illustrative" is merely intended to present concepts in a concrete fashion.

The lock of the present invention is a low profile, flush design, that minimally protrudes, if at all, from a window frame. When locking a casement window, the window is closed generally by a crank. The strikes on the moving sash are brought close to the pins on a tie bar mounted to the non-moving window frame. The lock handle or lever is then thrown. This drives an actuator or fork component within the lock, which engages the tie bar and drives it, moving the tie bar pins into engagement with corresponding hooks or strikes. The actuator or fork component typically presents itself as a flat structure adapted to slide within the lock casing, preferably having two extensions, such as leg portions, for engaging a tie bar. The strikes generally have a ramp surface at their mouth and the pins slide up this ramp into engagement. This motion pulls the sash tightly against the window frame generating compression for sealing the sash to the window frame.

To achieve a "flush," low profile appearance, the locking mechanism of the present invention utilizes a "three bar" linkage of the prior art, which is set between the handle, a restrictor, and an actuator element: the first of the three bar links formed by the handle between a first pivot at the actuator element and a second pivot at the restrictor; the second bar or link formed by the restrictor which pivots at each end thereof; and the third bar or link created by the actuator element and the sliding motion of the actuator element relative to a fixed pivot point of the restrictor on the body of the lock casing. The handle directly drives a fork component or the tie bar-structural limitations that result in a higher profile appearance. In the present design, the handle is allowed to move more deeply into the lock mechanism, and the escutcheon pocket is made deeper for this purpose, specifically to be flush with the mount, which greatly reduces the height of the lock casing.

FIG. 1 depicts a perspective view of the straight action lock mechanism 10 of the prior art with a handle in a locked position and having a separate latch release button 7 for accessing the handle. The lock may be mounted to the frame of an otherwise conventional casement window (not shown). A removable cover 5 and snap-on escutcheon 4 conceals the handle and internal components of the lock when the lock mechanism is installed, for example, in a wooden frame for a window. In this prior art design, to release the handle, a separate latch release button 7 is manually pressed toward the interior of the lock body.

As shown in FIG. 1, fork component 9 is employed that is similar to some prior art designs, insomuch as the fork component is used to engage a tie bar during locking and unlocking actuation. Under general operation, fork component 9 drives a tie bar or lock bar (not shown) that is mounted to the frame. One end of handle pivotally connects to fork component 9 via hinge or pivot pin, which may be a rivet or other rotatable, pivoting attachment. The handle further connects to a restrictor arm that is pivotally connected to casing 12 via hinge or pivot pin. A spring-biased, rotatable plate 3 is disposed within a top portion of the casing for preventing the handle from over-rotating. Actuation of the handle is initiated by the latch release button 7. The fork component 9 transitions longitudinally in the direction of arrow 11, and within a slot (not shown) along the elongated sidewall of the casement window lock, the pivot pin connecting the handle and restrictor arm shifts perpendicular to the longitudinal direction, as well as transversely, to allow the handle to rotate from an initial position.

Figure 2:
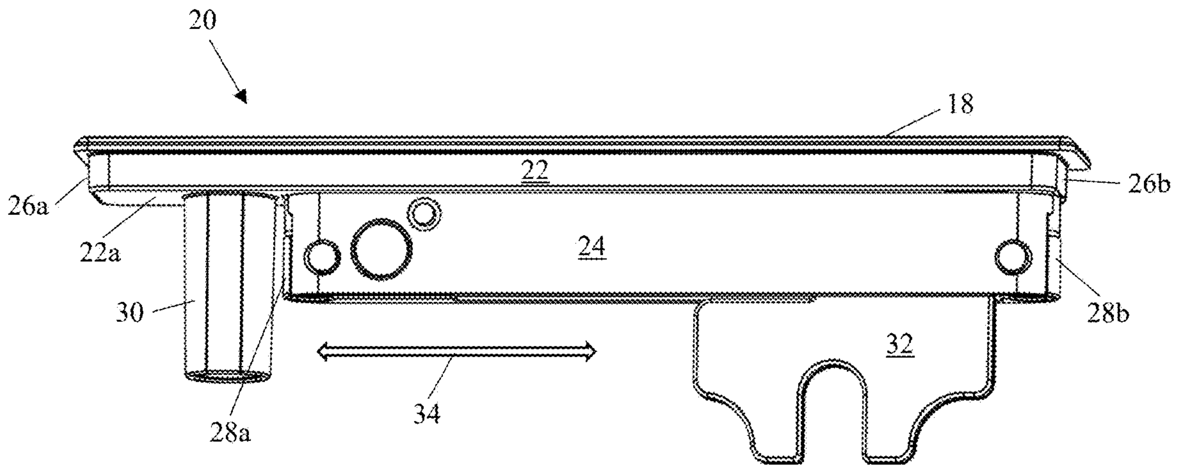
FIG. 2 depicts a side view of the straight action flush lock mechanism of an embodiment of the present invention with a detent mechanism housing extending from the bottom surface of the upper housing for enabling push-push activation by a user.

FIG. 2 depicts a side view of the straight action flush lock mechanism 20 of one embodiment of the present invention with a casing having an upper housing 22 and a lower housing or casing cover 24, and a detent mechanism housing 30 extending from the bottom surface 22*a* of the upper housing 22. Flush lock mechanism 20 includes upper housing 22 connected to a lower housing or casing cover 24. In contrast to the prior art, upper housing 22 includes a detent mechanism housing 30 extending from the lower surface 22*a* of upper housing 22. Detent mechanism housing 30 may be cylindrical in nature, illustratively depicted here as octagon sided, and may present polygon-sided faces; however, the outer shape of detent housing mechanism is not limited, and may be any other shape that allows for the movement of the detent mechanism components within its housing. Upper housing 22 receives escutcheon 18 on its top surface.

Escutcheon 18 includes a central slot 16 (see FIG. 5) to accommodate the rotational lever or handle 44. Rotational lever or handle 44 upon rotation accommodates the horizontal movement of a lock bar drive actuator, including fork or actuator component 32, which establishes the locking and unlocking functions. Slot 16 provides an elongated aperture to accommodate the full range of motion of the handle or lever 44 to move fork 32 as actuated by the handle. Lower housing cover 24 forms sidewalls having guide tracks (channels or grooves), and encloses the locking mechanism's moving components. As noted below, the sidewalls include guide tracks to confine the movement of fork 32.

For illustrative purposes, the shorter side of sidewalls of the upper and lower housings 26*a,b* and 28*a,b* respectively, will be deemed to be in a lateral direction, and movement by the fork or actuator component 32 will be considered movement along the elongated sidewall 24 in the longitudinal direction along arrow 34. These assigned directions are provided only to facilitate descriptions regarding movement of components with respect to the casement window lock; they do not represent direction of the casement window lock after it is mounted on a window frame. It is noted, however, that casement window locks are generally mounted so that the elongated casing is positioned vertically into the casement window.

Fork component 32 drives a tie bar or lock bar that is mounted to the frame. The tie bar engages a series of strikes that are mounted to a moving sash. Once the tie bar is engaged with the strikes, the window is locked.

In a preferred embodiment, an added detent mechanism initiates a push-push activate/deactivate action for the locking mechanism. The detent mechanism is housed in detent mechanism housing 30, which is connected or integral with the underside 22*a* of the upper housing 22. By utilizing a user activated push-push latch and release mechanism, it is possible to secure the lever to be significantly flush with the housing, more so than current prior art designs. The housing well may be deepened to accommodate the lower travel of the lever when a user activates the detent mechanism by pushing down on the lever.

Figure 3:
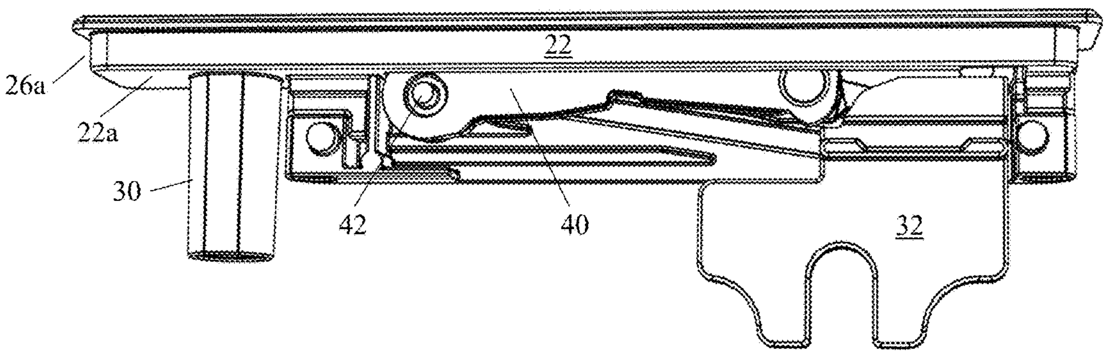
FIG. 3 depicts a side view of the straight action flush lock mechanism of FIG. 2 with a sidewall of the lower housing removed.

FIG. 3 depicts a side view of the straight action flush lock mechanism 20 of FIG. 2 with a sidewall of lower housing 24 removed. Restrictor arm 40 is shown attached to pivot or hinge 42. Restrictor arm 40 at one end connects to lever arm or handle 44.

Figure 4:
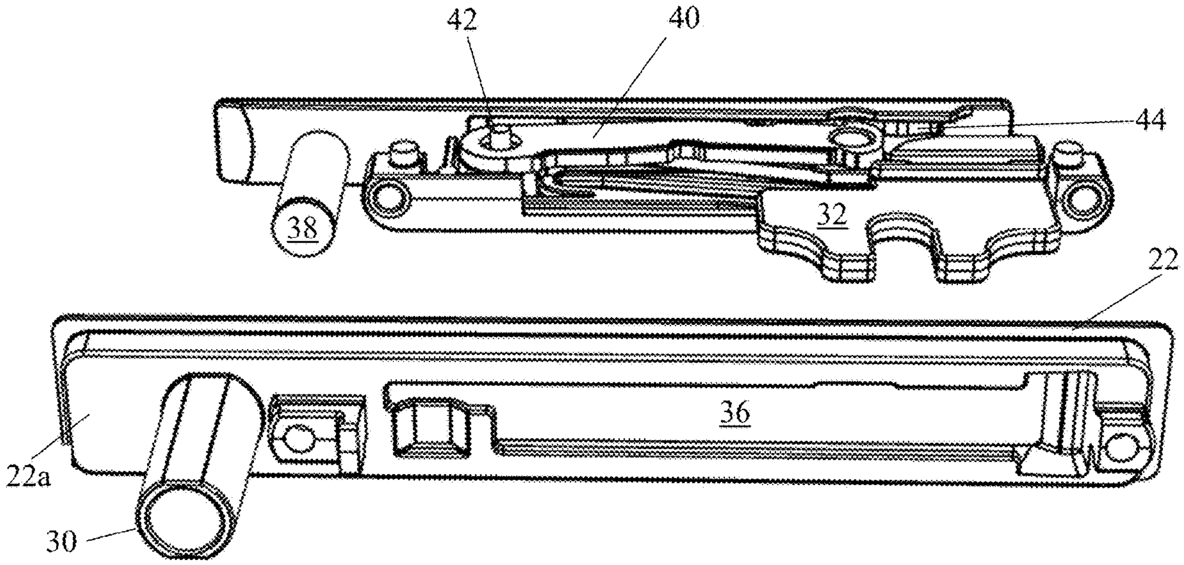
FIG. 4 is a bottom perspective, exploded view of the flush lock mechanism of FIG. 2, with the lower housing separated from the mechanical features of the lock.

FIG. 4 is a bottom perspective, exploded view of flush lock mechanism 20, with upper housing 22 separated from the mechanical features of the lock. Slot 36 provides access movement for the actuator or fork component 32. Detent mechanism housing 30 is depicted with a circular bottom having a cap 38 for enclosing the detent push-push actuation mechanism, and providing a stopping force for a resilient component, such as a spring, in the detent mechanism. As noted previously, detent mechanism housing 30 may be of other shape and dimension, and cap 38 could be shaped differently in order to accommodate the shape of the detent mechanism housing's bottom footprint.

Figure 5:
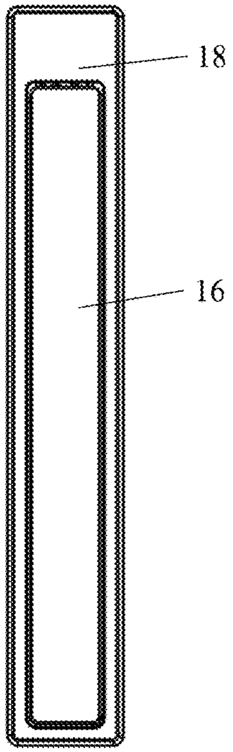
FIG. 5 depicts a top view of the escutcheon of the flush lock mechanism of FIG. 2 having a slot for receiving a lever arm.

FIG. 5 depicts a top view of escutcheon 18 of the flush lock mechanism of FIG. 2 having a slot 16 for receiving lever arm 44. In the current design, there is no need for a push button activation, and therefore the escutcheon does not require a separate aperture for a button.

Figure 6:
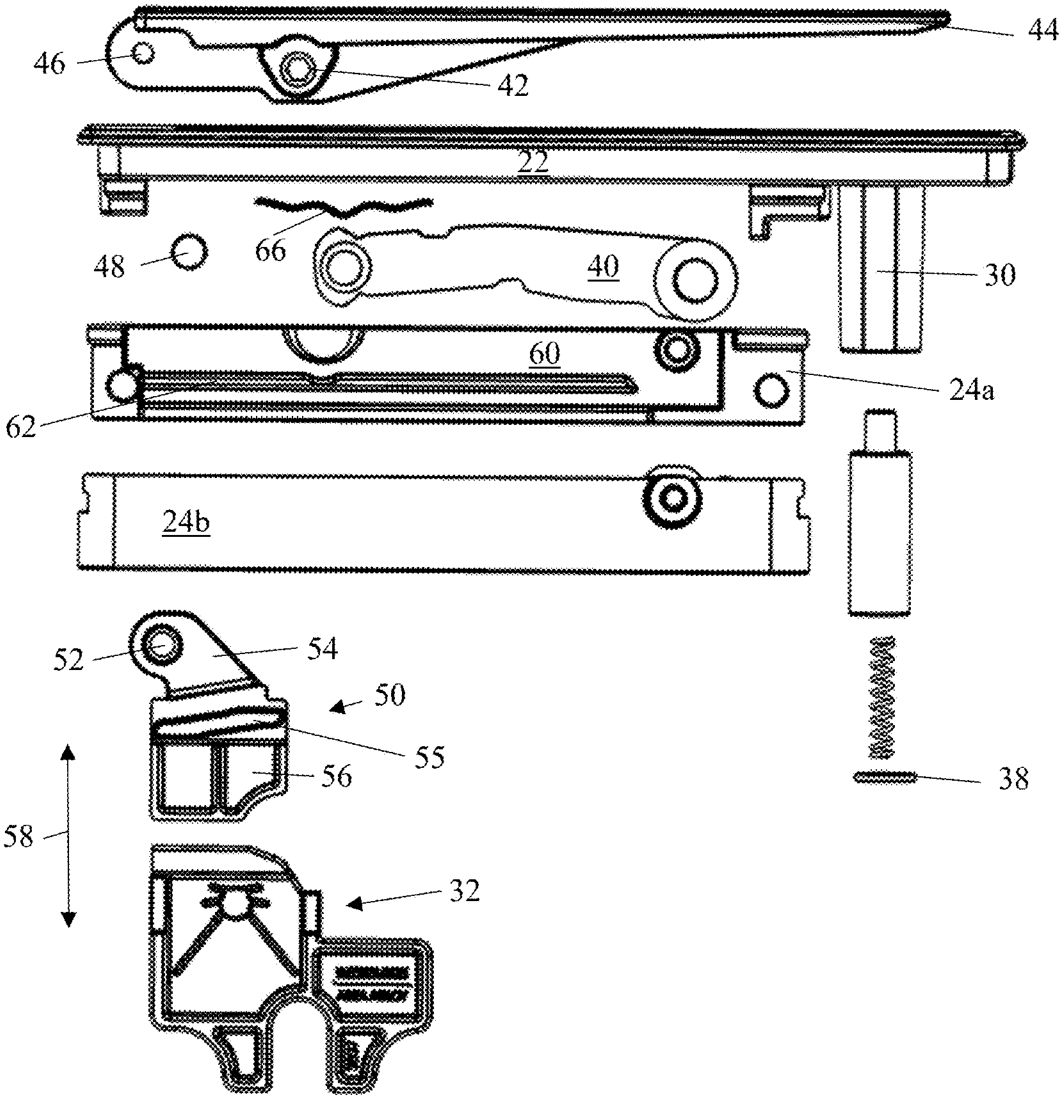
FIG. 6 represents an exploded view of the straight action flush lock mechanism of the present invention, depicting salient components to establish a push-push latching and unlatching feature.

FIG. 6 represents an exploded view of the straight action flush lock mechanism 20 of the present invention, depicting salient components to establish a push-push latching and unlatching feature that is activated directly by the lever arm. Lever arm 44 includes an aperture 46 for receiving a pivot pin 48, which connects lever arm 44 with aperture 52 in an attachment segment or rising arm 54 of lifter 50. Lifter 50 is slidably attachable to fork 32. The lifter-fork component configuration allows for a slidable attachment that enables lifter 50 to move vertical with respect to fork 32. The slidable attachment is preferably established with fork component 32 having a formed track for receiving slidable footing 56 of lifter 50. Slidable footing 56 of lifter 50 is preferably extended from the body of lifter 50 and inserted within the formed track of fork component 32, but may be slidably inserted in other combination schemes provided lifter 50 is capable of moving vertically in the direction of arrow 58 with respect to fork component 32.

During lock actuation, fork component 32 is restricted to horizontal motion. Lifter 50, which is slidably attached to fork component 32, moves vertically (in the direction of arrow 58) with respect to fork component 32. Lifter 50 includes attachment section or rising arm 54 having aperture 52 for receiving pivot pin 48 to pivotally secure handle or lever 44. Rising arm 54 is preferably an extended segment from the body of lifter 50; but, may also be a pivot point within the body of lifter 50. When lever arm 44 is actuated, lifter 50 moves vertically, and the lifter-fork component combination slides horizontally with the movement of lever arm 44. The horizontal movement of fork component 32 is controlled by a guide track 62 attached to, or integral with, inner casing sidewall 60 of lower housing sidewall portion 24*a*. In the preferred embodiment, guide track 62 is located on the inside surface of inner casing sidewall 60 of lower housing sidewall portion 24*a*. Fork component 32 includes an extension or protrusion, protruding from the fork component body in a direction perpendicular to the horizontal motion of travel of fork component 32 that may be a pin or a slightly elongated oval or rectangular line-shaped segment for slidably engaging guide track 62.

The extension or protrusion of fork component 32 may be integral with, or attached to, the fork component. Conversely, fork component 32 may include a track segment on its body that receives an extension or protrusion from the inner sidewall of lower housing 24. In either attachment scheme, fork component 32 is able to slide horizontally in guide track 62 along the elongated horizontal casing structure of lower housing 24*a* when induced by the actuation of lever 44.

A detent spring 66 is located between restrictor arm 40 and lever arm 44. Detent spring 66 provides tactile and audible indication that the lock mechanism has reached its end of travel. Additionally, a detent formation in the spring helps sustain lever arm 44 in the correct position at its end of travel.

Lifter 50 preferably includes a shaped protrusion or extension 55 on slidable footing 56. The pin or extension on the slidable footing is attached to, or integrally formed with, lifter 50.

Figure 7:
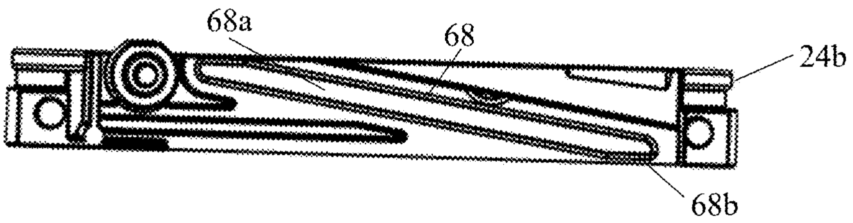
FIG. 7 depicts an inside sidewall of the lower housing portion, which includes a track for receiving the lifter pin or extension, where the track includes at least an angled section, and may include a partially horizontal section.

Referring to FIG. 7, inside sidewall 61 of lower housing portion 24*b* includes a track 68 for receiving the lifter pin or extension 54 of lifter 50. Track 68 includes at least an angled section 68*a*, and may include a partially horizontal section 68*b*. Angled section 68*a* tapers vertically upwards from the horizontal. Track 68 may be a purely slanting track that gradually slants upwards from a lower point to a higher point along the elongated horizontal casing structure of lower housing 24*b*. In a preferred embodiment, angled section 68*a* gradually raises lifter 50 from the horizontal over the length of travel as the lifter-fork component combination moves horizontally along the elongated horizontal casing structure of lower housing 24*b*. Without rising, angled section 68*a* of track 68, a binding condition would be experienced as the fork component is moved through its horizontal transition. Thus, in a preferred embodiment, actuating lever 44 serves to move simultaneously lifter 50 to a raised position while the lifter-fork component combination is moved horizontally about the casing. The introduction of lifter 50 structurally allows lever 44 to fold over further, essentially flipping over to the other side of the casing without binding. This allows lever 44 clearance to rotate about its pivot points without requiring extra depth to the casing. It is noted, however, that the casing may be slightly deeper than that of the prior art to accommodate the downward extension of the lever into the casing well in order to activate the detent mechanism of the present invention.

In contrast to the prior art, the updated design of the present invention reduces the amount of the mechanism that is protruding from the surface of the window and adds additional functionality to store and access the lock lever when not in use. This is realized by the actuation of a push-push detent mechanism for closing and opening lever 44.

Figure 8:
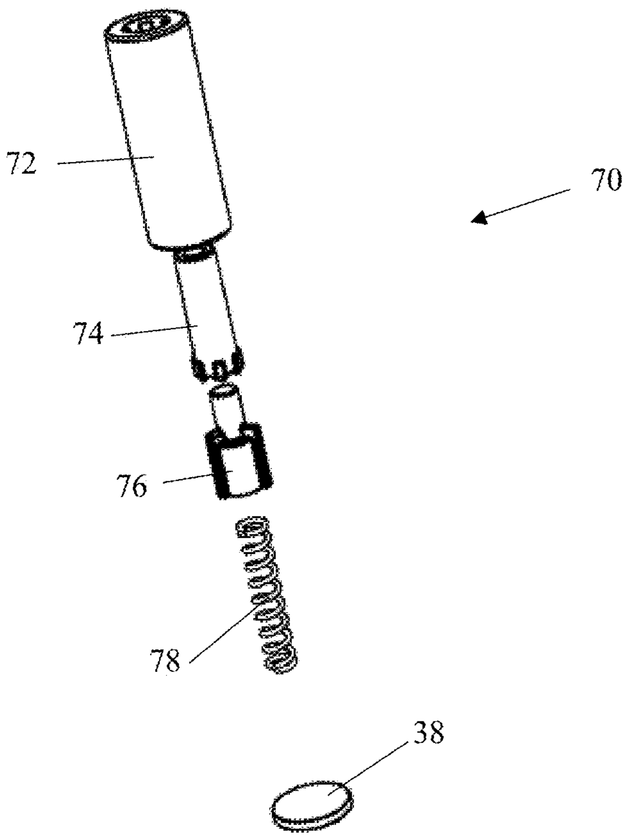
FIG. 8 depicts an exploded view of the detent mechanism of the present invention.

This novel actuation is performed by a detent mechanism housed in detent mechanism housing 30. FIG. 8 depicts an exploded view of the components that establish the detent mechanism 70 of the present invention. The detent mechanism includes a detent sleeve 72, a plunger 74, a ratchet 76, a coil spring 78, and housing cap 38. These components may be substantially cylindrical in nature, and housed in a substantially cylindrical cavity of detent mechanism housing 30; however, the housing design is not limited to a single geometric construct, and may be any shape capable of accommodating the detent mechanism components in slidable, movable fashion.

To unlock the handle or lever arm, a user will press the tip of the lever arm down to a "detent" position, generally until an audible click is registered, then release. The lever/detent mechanism will then rebound to a "popped" or "open" position, where the lever is no longer flush mounted with the escutcheon top surface. Rather, the lever arm rises above the escutcheon top surface to a position that allows the user to grasp and rotate it to an "unlocked" position to fully unlock the window.

The detent mechanism essentially utilizes a camming function in a push-push activation/deactivation scheme. The detent mechanism includes a rotating component with angled edges, such that lever arm 44, pushed downwards towards the escutcheon top surface by a user, depresses plunger 74, which interacts with ratchet 76. A base or bottom portion 74*a* of plunger 74 slidably interconnects with ratchet 76 in a rotational fashion, and ultimately, spring 78 is compressed against cap 38. Upon release of lever 44, in reaction to the resilient force of spring 78, lever 44 is pushed upwards, but the forward vertical extent of plunger 74 and sleeve 72 is structurally limited. At this point, lever 44 is positioned in a "popped" or "open" position for grasping by a user, and can be rotated to open the lock.

The interaction with detent spring 66 either upon extension or retraction of the position of the lever, may create a "click" sound as it moves between positions, providing audible feedback to the user with the different locations of the lever.

Figure 9:
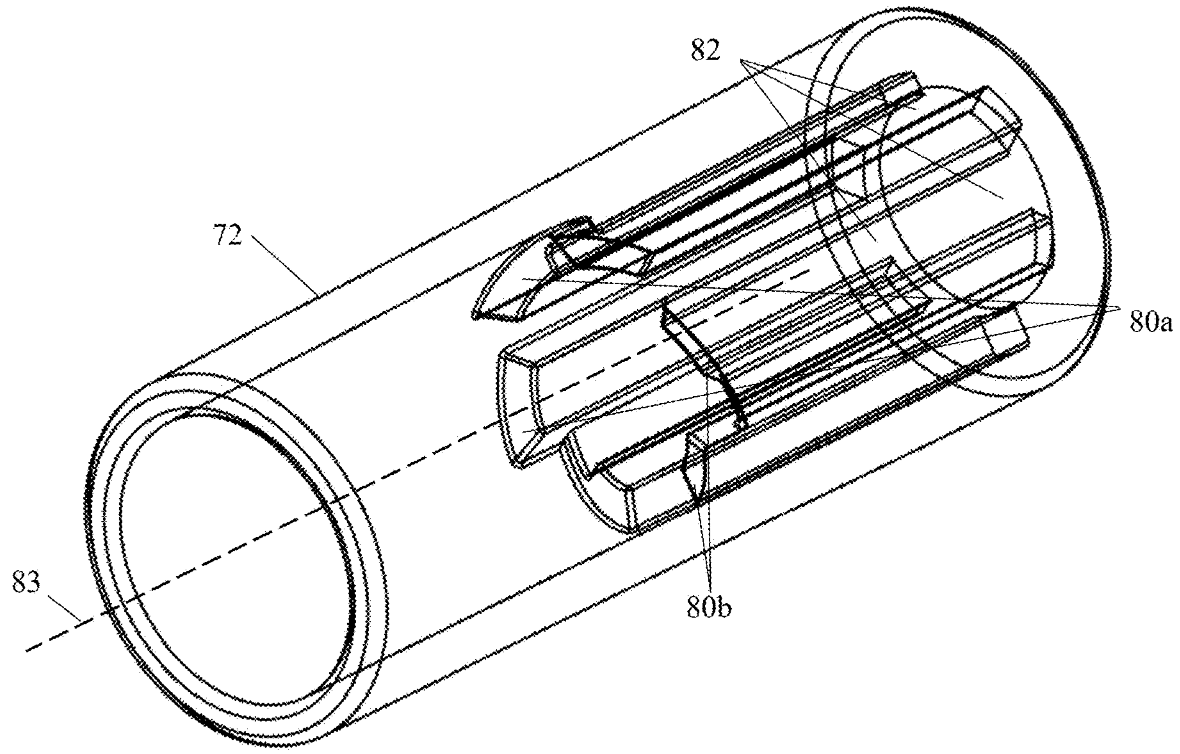
FIG. 9 depicts a transparent perspective view of the sleeve of the detent mechanism of FIG. 8.

FIG. 9 depicts a transparent, perspective view of sleeve 72 of the detent mechanism of the present invention. For an embodiment where the detent mechanism housing is substantially cylindrical, sleeve 72 is preferably a cylindrical shell having an internal cavity with differing lengths of internal segments 80*a,b* extending axially along the sleeve center axis 83, and radially inwards. Segments 80*a,b* are separated, and form gaps 82 therebetween. Segments 80*a,b* may be attached to, or integral with, sleeve 72, and may extend axially less than the full length of sleeve 72. In a preferred embodiment, long segments 80*a* are shown extended approximately one-half the length of sleeve 72. In contrast, short segments 80*b* are longitudinally shorter than segments 80*a*. As will be explained further below, the top portion of segments 80*a,b* allow for plunger 74 to sit either higher or lower within sleeve 72.

Figure 10:
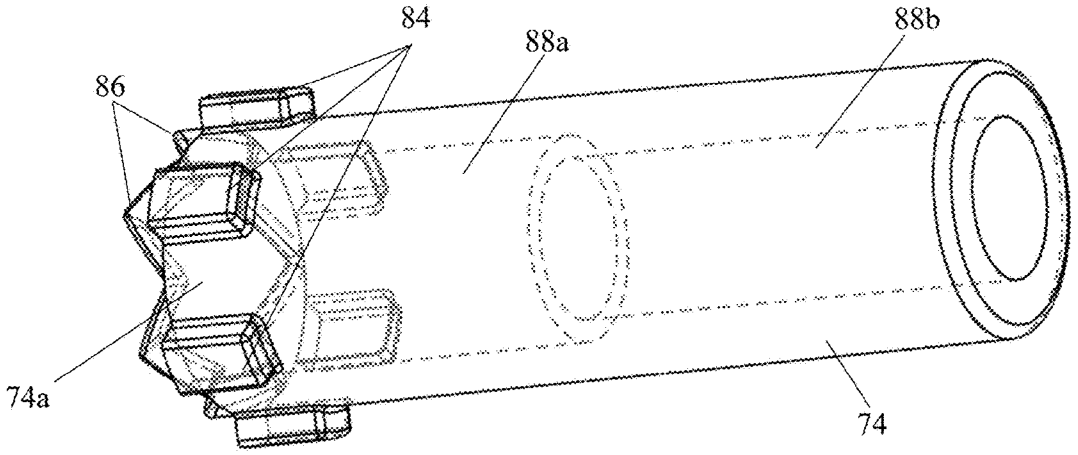
FIG. 10 is a transparent perspective view of one embodiment of the plunger of the detent mechanism of FIG. 8.

FIG. 10 is a transparent, perspective view of one embodiment of plunger 74 of the detent mechanism of FIG. 8. Plunger 74 may be cylindrical in nature, although other shapes are not prohibited, provided plunger 74 can be readily received within a complementary internal cavity of sleeve 72. Plunger 74 includes fixed guides 84 extending radially outwards about the circumference of plunger base or bottom 74*a*. Fixed guides 84 slidably interact with axial gaps 82 of sleeve 72 during activation. Protruding beyond base 74*a* are jagged, saw-toothed teeth 86 that establish a configuration for camming, and act to rotate plunger 74 within sleeve 72.

Figure 11A:
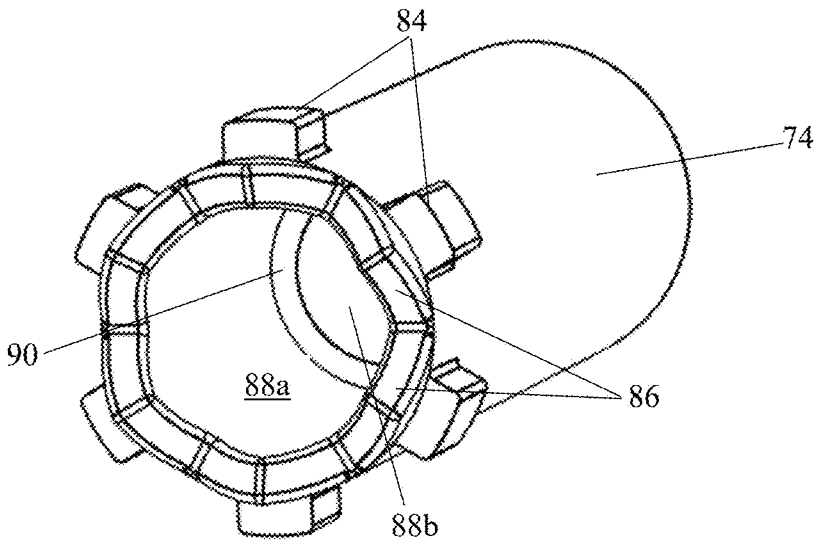
FIG. 11A depicts a bottom perspective view of the plunger of FIG. 10 showing the internal shelf formed at the intersection of a larger internal cylindrical cavity with a smaller internal cylindrical cavity.

Internally, plunger 74 includes two cylindrical cavities 88*a,b*. The first cavity 88*a* has a smaller cavity diameter than the larger, second cavity 88*b*. Together, the cavities form an internal shelf structure 90. FIG. 11A depicts a bottom perspective view of the plunger of the detent mechanism of FIG. 8 showing the internal shelf structure 90 formed at the intersection of a larger internal cavity 88*a* with a smaller internal cavity 88*b*. Preferably, these cavities are cylindrical, but may be other shapes provided the attaching component has a complementary receiving cavity. In the embodiment depicted in FIG. 11A, cavity 88*b* is dimensioned to receive cylindrical stem 92 of ratchet 76.

Figure 11B:
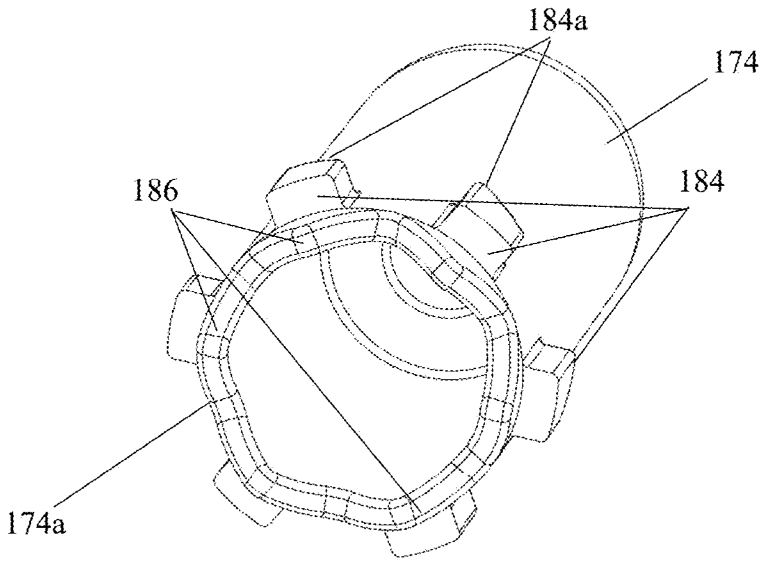
FIG. 11B depicts a second embodiment of the plunger of the present invention.

FIG. 11B depicts a second embodiment of the plunger of the present invention. Plunger 174 is shown with fixed guides 184 extending radially outwards about the circumference of plunger base or bottom 174*a*. Fixed guides 184 include a top surface 184*a* angled to facilitate sliding engagement. Fixed guides 184 slidably interact with axial gaps 82 of sleeve 72 during activation. Protruding beyond base 174*a* are jagged, saw-toothed teeth 186 that establish a camming configuration, and act to rotate ratchet 76.

Figure 11C:
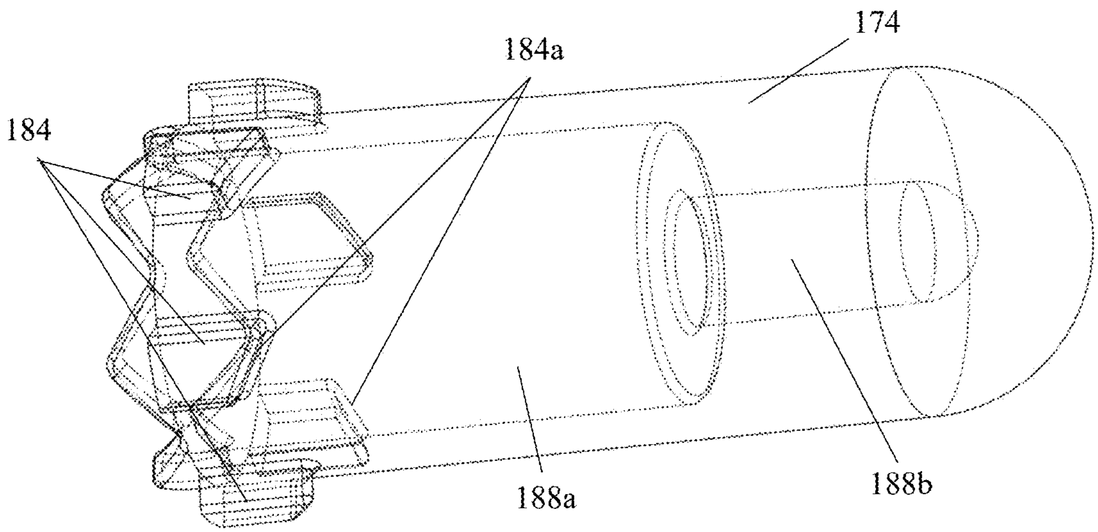
FIG. 11C is a side, transparent view of the second embodiment of the plunger of FIG. 11B, showing the angled top surface of the fixed guides.

FIG. 11C is a side, transparent view of the second embodiment of the plunger 174, showing the angled top surface 184*a* of fixed guides 184. Similar to the embodiment of FIG. 10, internal cavities 188*a* and 188*b* are depicted for receiving ratchet 76.

Figure 12:
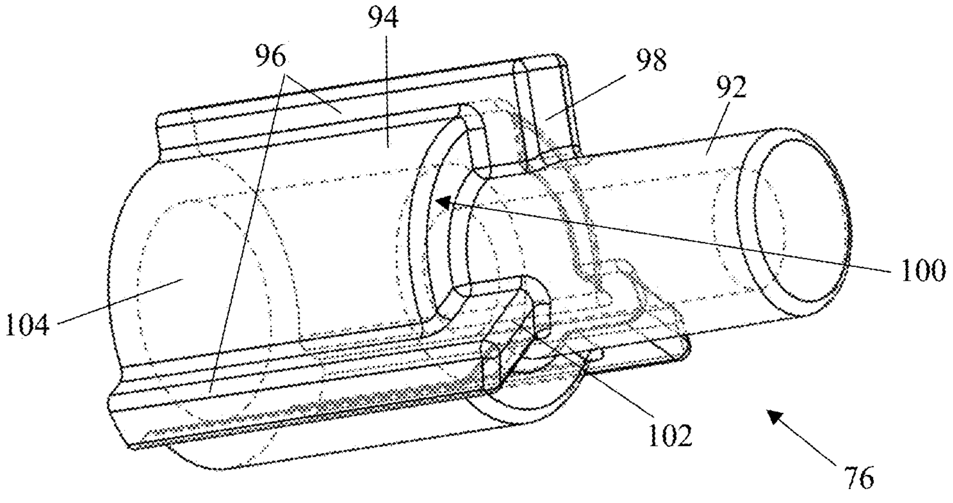
FIG. 12 depicts a transparent, perspective view of the ratchet of the detent mechanism of FIG. 8, showing a cylindrical stem extending from the ratchet base portion.

FIG. 12 depicts a transparent, perspective view of the ratchet 76 of the detent mechanism of FIG. 8. Cylindrical stem 92 extends from ratchet base portion 94. Base portion 94 has an outer diameter that is larger than the outer diameter of cylindrical stem 92. Axially directed teeth or keys 96 extend radially outwards from the bottom to the top of base portion 94, including having a radially inward segment 98 at the base portion top surface 100, extending to the outer surface of cylindrical stem 92. Each axial key 96 includes inclined surfaces 102 that traverse axially on the key sides to the top surface of inward segment 98, such that the inclined surface forms a camming, rotational action with saw-toothed teeth 86 of plunger 74. Spring 78 is received inside the internal cavity 104 of ratchet 76, and is secured at the bottom end by cap 38.

Figure 13:
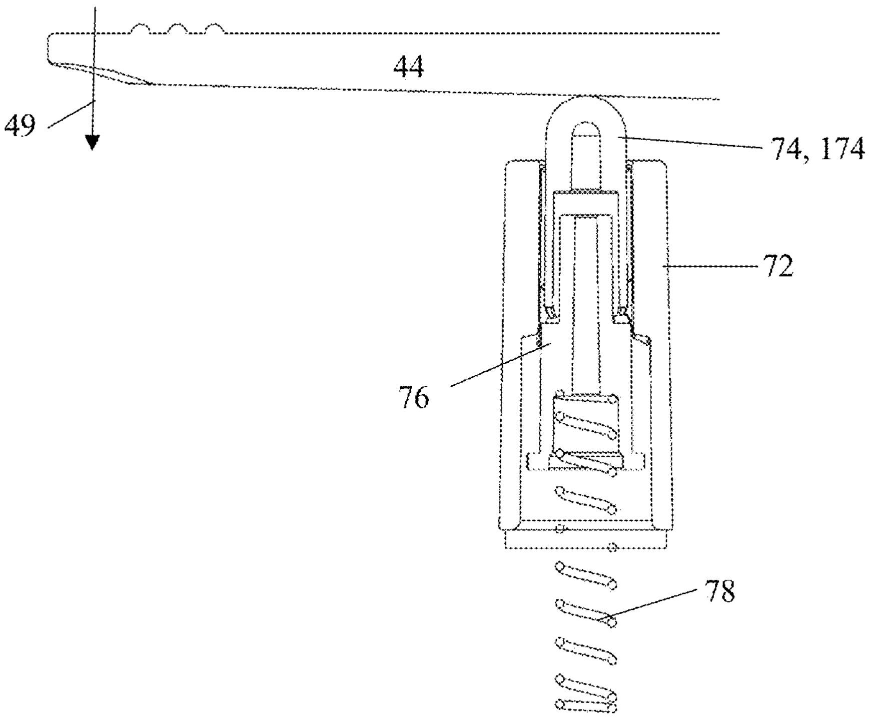
FIG. 13 depicts a cross-sectional view of the salient components of the detent mechanism interacting with the lever arm.

FIG. 13 depicts a cross-sectional view of the salient components of the detent mechanism interacting with the lever arm. In this figure, the detent mechanism is in the "popped" or "open" position, where a user is able to grasp lever arm 44 and rotate upwards to unlock the window. In this position, plunger 74, 174 has fixed guides 84, 184 that rest on the top surface of long segments 80*a* of sleeve 72, extending the plunger beyond the top surface of sleeve 72 in order to expose the lever arm 44 above the escutcheon to facilitate grasping of the lever arm by the user.

In order to lock the window, lever arm 44 is depressed by a user in the direction of arrow 49, and acts on plunger 74, 174 providing a downward force on the plunger. Plunger 74, 174 is slidably depressed through sleeve 72. Fixed guides 84 slide in a first set of axial gaps 82, and proceed below the bottom end of sleeve 72, where saw-toothed teeth 86 act on the inclined surfaces 102 of ratchet 76 in a camming fashion to rotate plunger 74, 174. After rotation, and upon release by the user of lever arm 44, spring 78 biases plunger 74, 174 upwards through a second set of axial gaps on sleeve 72 (adjacent to the first set), where the fixed guides 84, 184 rest on the top surface of short segments 80*b* of sleeve 72, which lowers lever arm 44 flush with the escutcheon.

The saw-toothed teeth 86, 186 of plunger 74, 174 provide a camming force on the inclined surfaces 102 of axial key 96 of ratchet 76. This rotates the plunger. Upon release by the user, plunger 74, 174 is acted upon by the resilient force of spring 78, pushing the plunger to a new position on sleeve 72.

Figure 14:
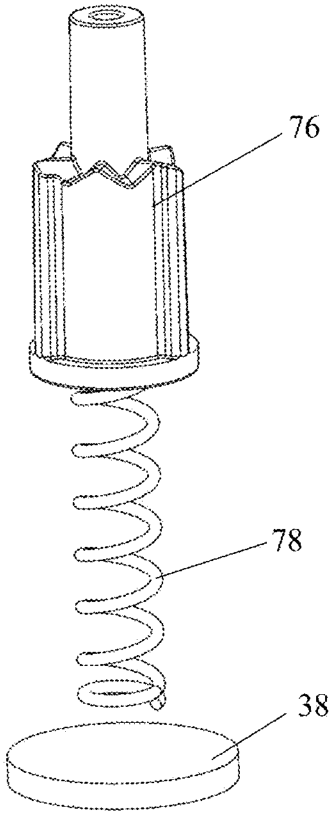
FIG. 14 is an exploded view of the ratchet/spring/cap configuration of the present invention.

FIG. 14 is an exploded view of the ratchet 76/spring 78/cap 38 configuration of the present invention.

To open a locked window, a user will push down on lever arm 44 such that it traverses below the escutcheon top surface, which may require a deeper housing well to accommodate the further downward trajectory of the lever arm. With the downward traversing lever arm 44, plunger 74 is pushed downward, generally until the "detent" position is reached. This may be coincident with an audible click. The user then releases lever arm 44. The lever/detent mechanism will then rebound to the "open" or "popped" position, and the plunger 74 (and lever arm 44) will rise above the escutcheon top surface. This position enables a user to grasp the lever arm, and rotate it to unlock the window.

The detent mechanism is essentially a compilation of a "push button plunger", a grooved sleeve with different sized internal segments and axial gaps, and a ratchet having axially directed teeth or keys for forming a camming action with the saw-toothed teeth on the bottom portion of the plunger, under a resilient force of a spring. Each thrust of the lever by a user does one of two actions: pushes the camming features against the force of the spring, such that the plunger fixed guides are rotated into an adjacent set of axial gaps on the sleeve, and ultimately rest on either one set of internal segments of the sleeve, or the other set. When resting on the longer internal segments of the sleeve, the plunger extends above the escutcheon top surface and remains in a "popped" or "open" position. When resting on the shorter internal segments of the sleeve, the plunger sits below the top surface of the escutcheon, and the lever arm is flush with the escutcheon top surface.

In the locked or closed position, the spring force pushes vertically upwards on the ratchet and plunger combination until the internal structural features do not allow for any further upward movement. At this point, the plunger sits on the top surface of the shorter internal segments of the sleeve, and the lever arm top surface is flush with the escutcheon top surface.

In order to unlock the device, a user presses downwards on the lever arm so that the lever arm is below the escutcheon top surface, forcing a camming and rotational action between the plunger and ratchet of the detent mechanism, which puts the plunger in a new position, allowing for the extension of the plunger vertically upwards in a "popped" or "open" position, releasing the lever arm from the escutcheon, and allowing the user to grasp it. The lever arm may now be rotated to unlock and open the window.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A flush lock for a casement window, said flush lock comprising:

a handle or a lever arm;

a casing including:

an upper housing having a bottom surface, and a lower housing having first and second sidewalls; and a detent mechanism housing extending from said bottom surface of said upper housing;

said lower housing including an elongated aperture or slot to accommodate a full range of motion of said handle or said lever arm, said first sidewall or said second sidewall having a guide tracks to confine movement of a fork component or an actuator component;

said fork component or said actuator component slidable in a longitudinal direction parallel with said elongated aperture or slot of said lower housing, is configured to engage a lock bar, and has a body configured for slidably engaging said guide tracks, said fork component or said actuator component including a formed lifter guide track for slidably receiving a lifter, such that said lifter is slidably engaged to move in a direction perpendicular to said longitudinal direction, upwards towards said handle or said lever arm; and a detent mechanism forming a push-push activation of said handle or said lever arm, said detent mechanism including a sleeve, a plunger, a ratchet, a spring, and a cap, said detent mechanism housed within said detent mechanism housing.

2. The flush lock of claim 1, wherein said sleeve slidably interacts with said plunger, said sleeve being a shell having an internal cavity, and internal segments extending axially along a center axis of said sleeve and radially inwards.

3. The flush lock of claim 2, wherein said internal segments of said sleeve are separated by gaps, and said internal segments extend axially less than a full length of said sleeve.

4. The flush lock of claim 3, wherein said internal segments comprise a first set of segments and a second set of segments, wherein said first set of segments are longer in an axial direction along the center axis of the sleeve than said second set of segments.

5. The flush lock of claim 3, wherein said plunger is configured to be received by said internal cavity of said sleeve, said plunger having fixed guides extending radially outwards about a base of said plunger, said fixed guides slidably interact with said gaps of said sleeve during said push-push activation.

6. The flush lock of claim 1, wherein said plunger includes a bottom or base portion having saw-toothed teeth protruding beyond said bottom or base portion, said saw-toothed teeth configured to form a camming action with said ratchet, wherein upon activation of said plunger, said camming action rotates said plunger.

7. The flush lock of claim 6, wherein said plunger includes two internal cylindrical cavities, a first cavity having a smaller cavity diameter than a larger second cavity, wherein together, said first and second cavities form an internal shelf structure.

8. The flush lock of claim 2, wherein said sleeve forms a polygon shape at least on an outside surface.

9. The flush lock of claim 6, wherein said ratchet includes a base portion and a cylindrical stem extending from said base portion, said base portion having an outer diameter larger than an outer diameter of said cylindrical stem, and axially directed keys extending radially outwards from a bottom to a top surface of said base portion, and each including a radially inward segment at said top surface of said base portion-top, said radially inward segment extending to an outer surface of cylindrical stem.

10. The flush lock of claim 9, wherein said axially directed keys of said ratchet include inclined surfaces on ends of said keys that are angled in an axial direction towards a top surface of each corresponding radially inward segment of said ratchet, such that said inclined surfaces form said camming action; when placed in contact with said saw-toothed teeth of said plunger.

11. The flush lock of claim 9, wherein a first cavity of said plunger receives said cylindrical stem of said ratchet.

12. The flush lock of claim 1, wherein said spring provides a resilient force to said ratchet and plunger at one end, and to the cap at an opposite end, said cap sealing said spring within said detent mechanism housing.

13. The flush lock of claim 1, wherein horizontal movement of said fork component or said actuator component is controlled by one of said guide tracks of said first sidewall or said second sidewall of said lower housing, and wherein said first sidewall or said second sidewall of said lower housing includes a guide track for receiving an extension of a lifter cooperating with said fork component or said actuator component and having at least an angled section and a partially horizontal section.

14. A flush lock for a casement window, said flush lock comprising:

a lever arm;

a casing including:

an upper housing; and a lower housing including an elongated aperture or slot to accommodate a full range of motion of said lever arm, sidewalls having guide tracks to confine movement of a fork component or an actuator component, and a detent mechanism housing extending from a bottom surface of said lower housing, said detent mechanism housing secured at a bottom end by a cap;

a restrictor arm pivotally attached at one end to said lever arm; and pivotally attached at an opposite end to said lower housing; and a detent mechanism forming a push-push activation of said lever arm, said detent mechanism including:

a sleeve being substantially a shell having an internal cavity and internal segments extending axially along a center axis of said sleeve, said internal segments extending radially inwards and being separated by gaps, and extending axially less than a full length of said sleeve, each of said internal segments having a top surface;

a plunger, configured to be received by said internal cavity of said sleeve, said plunger includes fixed guides extending circumferentially radially outwards about a base of said plunger, said fixed guides slidably interact with said gaps of said sleeve during activation, said plunger includes a bottom or base portion having teeth protruding beyond said bottom or base portion, said teeth configured to form a camming action with a ratchet, rotating said plunger;

said ratchet having a base portion and a cylindrical stem extending from said base portion, said base portion having an outer diameter larger than an outer diameter of said cylindrical stem, and axially directed keys extending radially outwards from a bottom to a top surface of said base portion, said axially directed keys each having a radially inward segment at said top surface of said base portion, said radially inward segments extending to an outer surface of cylindrical stem, wherein each of said axially directed keys includes an inclined surfaces that is angled axially upwards along a side of said corresponding one of said axially directed keys to a top surface of said radially inward segment, such that said inclined surfaces form a camming action when placed in contact with said teeth of said plunger, thereby rotating said plunger; and a spring providing a resilient force to said ratchet and said plunger at one end; and to said cap at an opposite end, said cap sealing said spring within said detent mechanism housing.

15. The flush lock of claim 14, further comprising an escutcheon attached to said upper housing of said casing, said escutcheon having a top surface and a slot or aperture for receiving said lever arm.

16. The flush lock of claim 15, wherein said casing has a depth for receiving said lever arm below said top surface of said escutcheon, and said detent mechanism allowing for said lever to be pushed below said top surface of said escutcheon.

17. The flush lock of claim 15, wherein said detent mechanism provides a structural block for a vertically upward extension of said plunger, such that upon an open activation, said lever arm is raised above said escutcheon top surface to enable grasping by a user.

18. A method of unlocking a flush lock in combination with a casement window, said method comprising:

providing said flush lock having a lever arm for actuating a fork component associated with a locking tie bar of said casement window, and a detent mechanism configured for push-push activation, said detent mechanism including a sleeve, a plunger, a ratchet, a spring, and a cap, said detent mechanism housed within a detent mechanism housing of a casing of said flush lock;

pushing said lever arm from an initial position flush with a top surface of an escutcheon that forms part of a top surface of said casing towards said casing and below said top surface of said escutcheon to release said lever arm, wherein said plunger and said ratchet are biased by said spring in a direction towards said lever arm, and wherein the pushing of said lever arm comprises pushing said lever arm in a direction towards said casing and comprises lowering said plunger against said ratchet' such that said plunger rotates relative to said sleeve in a camming action;

releasing said lever arm, such that said detent mechanism acts on said lever arm to extend said lever arm above said top surface of said escutcheon, exposing said lever arm in an open position away from said escutcheon top surface for grasping by a user; and rotating said lever arm to an unlocked position to unlock said casement window.

19. The method of claim 18, wherein:

said sleeve includes an internal cavity and internal segments extending axially along a center axis of said sleeve, said internal segments extending radially inwards and being separated by gaps, and extending axially less than a full length of said sleeve, and said internal segments including a first set of internal segments axially longer than a second set of internal segments, each of said internal segments having a top surface; and wherein said plunger includes fixed guides extending circumferentially radially outwards about a base of said plunger;

and wherein said method further comprises:

slidably interacting said fixed guides with said gaps of said sleeve during activation, said plunger having a bottom or base portion having teeth protruding beyond said bottom or base portion, said teeth configured to form the camming action with said ratchet, thereby rotating said plunger; and situating said plunger fixed guides on a top surface of said first set of internal segments, such that said plunger raises said lever arm above said top surface of said escutcheon.

20. A method of locking a flush lock in combination with a casement window, said method comprising:

providing said flush lock having a lever arm for actuating a fork component associated with a locking tie bar of said casement window, and a detent mechanism configured for push-push activation, said detent mechanism including a sleeve, a plunger, a ratchet, a spring, and a cap, said detent mechanism housed within a detent mechanism housing of a casing of said flush lock, wherein said sleeve includes an internal cavity and internal segments extending axially along a center axis of said sleeve, said internal segments extending radially inwards and being separated by gaps extending axially less than a full length of said sleeve, and said internal segments including a first set of internal segments axially longer than a second set of internal segments, each of said internal segments having a top surface, and wherein said plunger includes fixed guides extending circumferentially radially outwards about a base portion of said plunger, said base portion of said plunger further having teeth protruding beyond said base portion and configured to form a camming action with said ratchet, thereby rotating said plunger;

rotating said lever arm towards said flush lock;

slidably interacting said fixed guides of said plunger with said gaps of said sleeve;

pushing said lever arm from an initial position above a top surface of an escutcheon that forms part of a top surface of said casing towards said casing and below said a-top surface of said escutcheon; and releasing said lever arm, such that said detent mechanism acts on said lever arm to align a top surface of said lever arm with said top surface of said escutcheon, such that said top surface of said lever arm is flush with said top surface of said escutcheon, wherein said fixed guides of said plunger are situated on a top surface of said first set of internal segments, such that said plunger raises said lever arm to a level of said top surface of said escutcheon.

* * * * *